United States Patent
Goldberg et al.

(10) Patent No.: US 10,306,340 B2
(45) Date of Patent: May 28, 2019

(54) SYSTEM AND METHOD FOR COLLECTING AND AGGREGATING WATER USAGE DATA BASED ON VIBRATION SENSORS

(71) Applicant: ORACLE INTERNATIONAL CORPORATION, Redwood Shores, CA (US)

(72) Inventors: Joseph H. Goldberg, San Carlos, CA (US); Mark Vilrokx, San Mateo, CA (US); Diane L. Boross, Belmont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 15/421,478

(22) Filed: Feb. 1, 2017

(65) Prior Publication Data

US 2017/0223434 A1     Aug. 3, 2017

Related U.S. Application Data

(60) Provisional application No. 62/289,963, filed on Feb. 2, 2016.

(51) Int. Cl.
*H04Q 9/00* (2006.01)
*G01F 1/66* (2006.01)
*G06Q 50/06* (2012.01)

(52) U.S. Cl.
CPC .............. *H04Q 9/00* (2013.01); *G01F 1/666* (2013.01); *G06Q 50/06* (2013.01); *H04Q 2209/47* (2013.01); *H04Q 2209/60* (2013.01)

(58) Field of Classification Search
CPC . G01F 1/00; G01F 1/66; G01F 1/7082; E21B 47/10; H09Q 9/00
(Continued)

(56) References Cited

U.S. PATENT DOCUMENTS

2005/0125166 A1* 6/2005 Loose ................... G01F 1/3254
                                                                    702/45
2005/0125170 A1* 6/2005 Gysling ................. G01F 1/666
                                                                    702/48

(Continued)

FOREIGN PATENT DOCUMENTS

JP          2015163903 A        9/2015

OTHER PUBLICATIONS

Xu et al.; Anti-Strong-Disturbance Signal Processing Method of Vortex Flowmeter With Two Sensors; pp. 1-3; downloaded Jan. 31, 2017 from: http://aip.scitation.org/doi/full/10.1063/1.3632119.
(Continued)

*Primary Examiner* — Albert K Wong
(74) *Attorney, Agent, or Firm* — Kraguljac Law Group, LLC

(57) ABSTRACT

Embodiments are disclosed that sense vibrations caused by flow of water in pipes, and covert the sensed vibrations into water usage data which can be analyzed, aggregated, and made available to users. In one embodiment, mechanical vibrations of a pipe are sensed, via a piezo-electric sensor attached to an external surface of the pipe, to form analog electrical signals. The analog electrical signals are converted into time-sampled digital data via a microcontroller having analog-to-digital conversion capability. A frequency analysis is performed on the time-sampled digital data, via at least one processor, to generate spectral data. The spectral data is analyzed, via the at least one processor, to determine whether the vibrations are caused by a fluid flowing through the pipe.

16 Claims, 6 Drawing Sheets

(58) Field of Classification Search
USPC ........ 73/197, 861, 861.17; 702/48; 340/606; 700/28
See application file for complete search history.

(56) References Cited

U.S. PATENT DOCUMENTS

| | | | | |
|---|---|---|---|---|
| 2005/0128170 | A1* | 6/2005 | Kang | G09G 3/20 345/87 |
| 2006/0201430 | A1* | 9/2006 | Davis | G01F 1/666 119/14.02 |
| 2006/0225514 | A1* | 10/2006 | Conquergood | G01F 1/666 73/861 |
| 2007/0022824 | A1* | 2/2007 | Bailey | G01F 1/666 73/861.17 |
| 2007/0261486 | A1* | 11/2007 | Fallet | E21B 47/10 73/152.29 |
| 2007/0279235 | A1* | 12/2007 | Davis | G01F 1/7082 340/606 |
| 2013/0085688 | A1* | 4/2013 | Miller | G01F 1/66 702/48 |
| 2014/0174186 | A1 | 6/2014 | Salomon | |
| 2016/0061640 | A1* | 3/2016 | Joshi | G01F 1/00 73/197 |

OTHER PUBLICATIONS

Meng Joo Er, et al.; A Low-Cost Digital Display for Flow Rate Measurements in a Target Fluidic Flowmeter; pp. 1-9; downloaded Jan. 31, 2017 from: https://www.researchgate.net/publication/239752759_A_Low-Cost_Digital_Display_for_Flow_Rate_Measurements_in_a_Target_Fluidic_Flowmeter.

Mink et al.; Low Cost Sensors and Systems for Collecting Water Usage in Three Pilots; pp. 1-7; IAHR 2015 Netherlands; E-proceedings of the 36th IAHR World Congress.

* cited by examiner

SYSTEM AND METHOD FOR COLLECTING AND AGGREGATING WATER USAGE DATA BASED ON VIBRATION SENSORS

CROSS REFERENCE TO RELATED APPLICATIONS

This disclosure claims the benefit of U.S. Provisional Patent Application Ser. No. "62/289,963" filed Feb. 2, 2016, titled "System and Method for Recording and Aggregating Water Usage Data", which is incorporated by reference herein in its entirety.

BACKGROUND

Water is a precious commodity and is no longer treated as a limitless resource. It is becoming commonplace for communities, enterprise organizations, and residences to have mandated cutbacks imposed in an attempt to save as much water as possible. In considering where and how to limit water use, flow and leakage issues have to be rapidly diagnosed and resolved.

Sensing of water flow has been conducted using in-line water meters. While such meters are accurate and reliable, it is too expensive and intrusive to place an in-line metering device at every water-demanding appliance. Until such meters are built into every faucet, toilet, showerhead, irrigation valve, etc., an inexpensive monitoring solution should be pursued.

Also, liquid flow measurement is available to industry using ultrasonic sensing technology. Such technology employs ultrasonic meters to sense the ultrasonic Doppler change in a frequency range due to fluid flow. However, ultrasonic meters are impractical to scale across an enterprise organization because they are too expensive, designed to work only on larger pipes, and often have to be attached using a conductive grease.

An inexpensive and easily scalable solution is desired to measure water usage and provide meaningful water usage metrics to planners in government and industry, as well as to individual consumers.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Computerized systems, methods, and other embodiments are disclosed for generating, collecting, analyzing, and aggregating water usage data across an enterprise organization. Inexpensive, externally-mounted piezo-electric sensor units are used to sense water flowing within a variety of faucets and pipes. Metrics derived from selected frequency bands are sensitive to the water flow. Aggregation and reporting of water usage data derived from the sensor units across the enterprise organization enable the enterprise organization to quickly monitor water usage to determine where leaks occur and where maintenance is required.

In accordance with one embodiment, water usage data is wirelessly collected from multiple sensor units attached to exterior surfaces of multiple pipes via a private computer network on a local campus of an enterprise organization. Each of the multiple sensor units includes a piezo-electric sensor configured to sense and convert mechanical vibrations (e.g., due to flowing water) to electrical signals. Water usage data is derived from the electrical signals. The water usage data is aggregated, via the private computer network, at different hierarchical levels based on associated water-using appliances and zones within the local campus to form locally aggregated water usage data. The locally aggregated water usage data is transmitted from the private computer network to a cloud computing and storage system via a public computer network. Similarly, water usage data may be collected from other local campuses of the enterprise organization, aggregated, and transmitted to the cloud computing and storage system.

The following terms are used herein with respect to various embodiments.

The terms "enterprise" and "enterprise organization" are used interchangeably herein and refer to a company or other organization (e.g., a residence or a community of residences) having multiple buildings and facilities distributed across one or more campuses across one or more cities, states, or countries.

The term "pipe", as used herein, refers to any tube of metal, plastic, or other material used for the conveyance of a fluid such as, for example, water.

The term "water usage data", as used herein, refers to time-sampled digital data derived from a piezo-electric sensor attached to the exterior of a pipe, or any other data associated with or derived from the time-sampled digital data such as, for example, spectral data, statistical data, flow-rate data, and location data.

Figure 1:
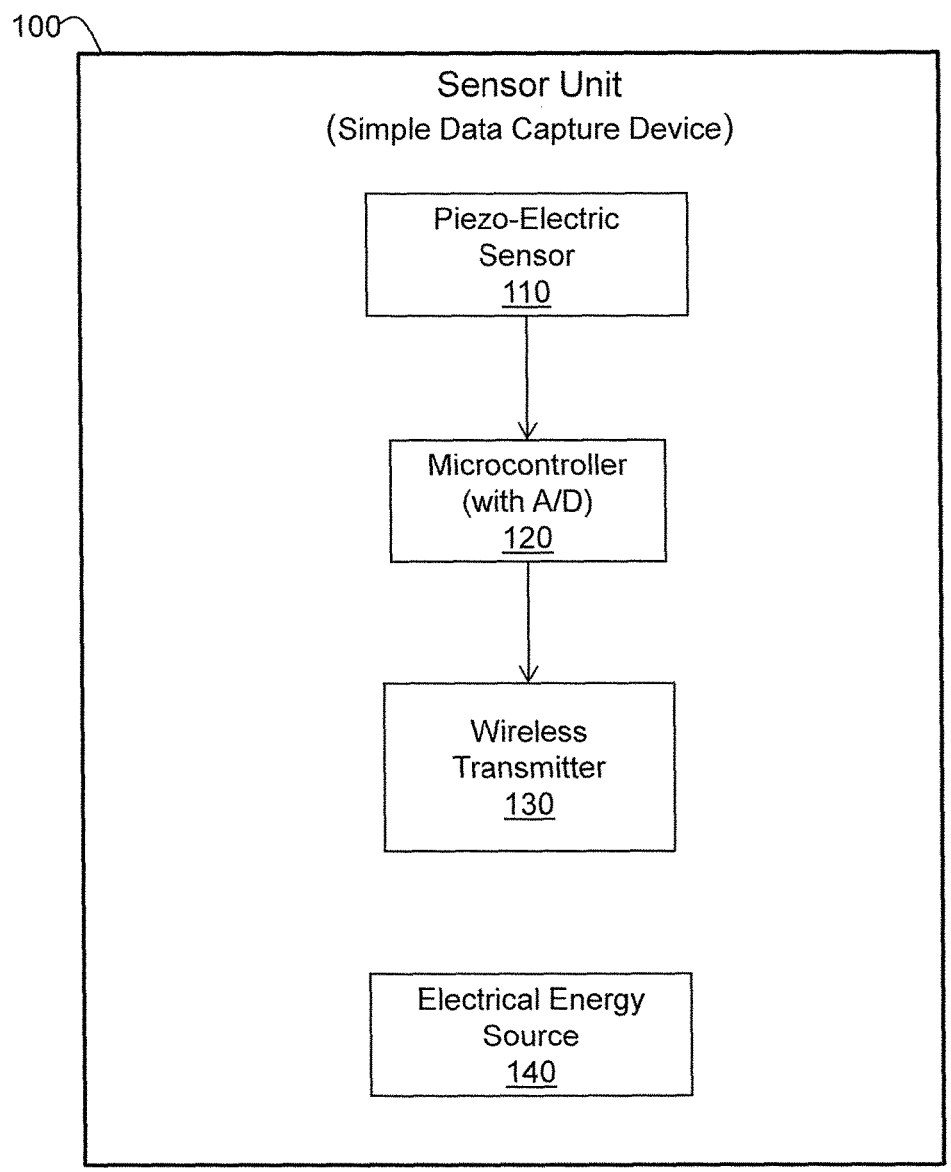
FIG. 1 illustrates one embodiment of a sensor unit configured to attach to an external surface of a pipe and sense vibrations in the pipe caused by water flowing through the pipe.

FIG. 1 illustrates one embodiment of a sensor unit 100 configured to attach to an external surface of a pipe and sense vibrations in the pipe caused by water flowing through the pipe. The sensor unit 100 includes a piezo-electric sensor 110, a microcontroller 120 with analog-to-digital conversion capability, a wireless transmitter 130, and an electrical energy source 140. Alternatively, the analog-to-digital conversion capability (e.g., an analog-to-digital converter) can be external the microcontroller 120.

Furthermore, in other embodiments, the sensor 110 may instead be an accelerometer or a microphone, for example. In one embodiment, the accelerometer produces digital signals in multiple axes. A Euclidean measure can be used to combine the digital signals from the multiple axes (e.g., via the microcontroller 120). In such an embodiment, a separate analog-to-digital conversion capability in the microcontroller 120 may not be needed.

In one embodiment, the piezo-electric sensor 110 is a piezo-electric film sensor configured to sense mechanical vibrations caused by water flowing through a pipe to which the sensor unit 100 is attached. The pipe may supply an appliance with water, for example. The piezo-electric sensor is configured to convert the sensed mechanical vibrations to signals (e.g., analog electrical signals) that are representative of the mechanical vibrations.

In one embodiment, the microcontroller 120 receives the analog electrical signals from the piezo-electric sensor 110 and converts the analog electrical signals into time-sampled digital data. The time-sampled digital data is a digital representation of the analog electrical signals over time. The wireless transmitter 130 receives the time-sampled digital data from the microcontroller and wirelessly transmits the time-sampled digital data to a processing node of a private computer network. In one embodiment, the wireless transmitter 130 transmits the time-sampled digital data in accordance with a WIFI wireless communication standard. In another embodiment, the wireless transmitter 130 transmits the time-sampled digital data in accordance with a Bluetooth wireless communication standard. Other types of wireless communication standards are possible as well, in accordance with other embodiments. Selectable sampling characteristics (e.g., sampling frequency and time period between sample collections) are provided, in accordance with one embodiment.

In one embodiment, the electrical energy source 140 provides electrical energy to the microcontroller 120 and the wireless transmitter 130. The piezo-electric sensor 110 generates a voltage itself in response to sensing mechanical vibrations. The microcontroller 120 may include an amplifier circuit to amplify the voltage produced by the piezo-electric sensor 110. Alternatively, the piezo-electric sensor 110 may include an amplifier circuit to amplify the voltage produced by the piezo-electric sensor 110 and, as such, use electrical energy from the electrical energy source 140. For example, the electrical energy source 140 is a battery, in accordance with one embodiment. In another embodiment, the electrical energy source 140 is an array of photo-voltaic cells. Other types of electrical energy sources are possible as well, in accordance with other embodiments.

In this manner, a sensor unit 100 can be attached to a pipe providing water to an appliance on a campus of an enterprise organization. The sensor unit 100 can collect data from the pipe and wirelessly transmit the data to a nearest processing node of a private computer network on the campus. No dedicated wires or cables between the sensor unit 100 and the private computer network are needed.

Figure 2:
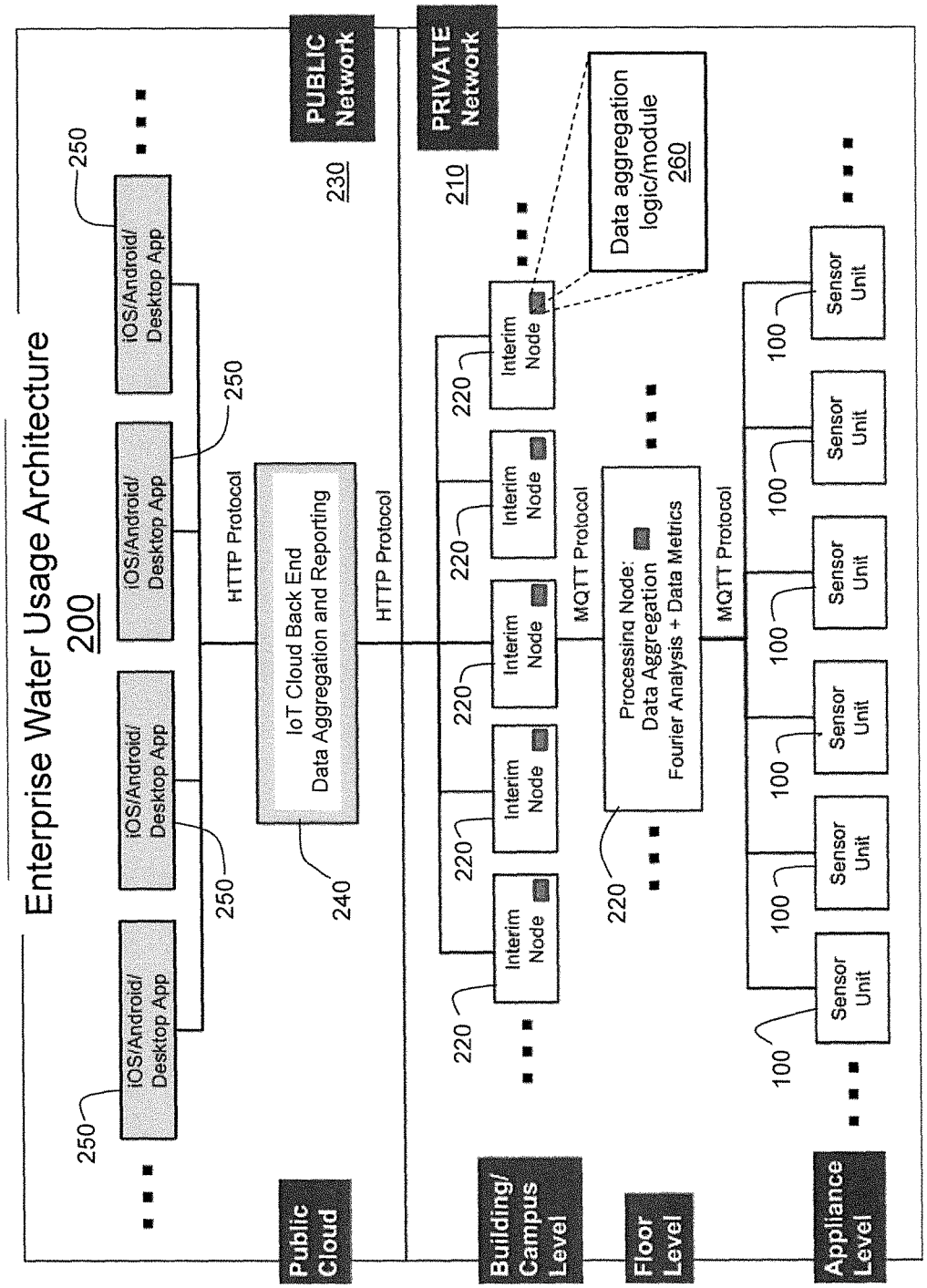
FIG. 2 illustrates one embodiment of an enterprise water usage architecture, which includes multiple sensors units from FIG. 1, for collecting and aggregating water usage data over the entire enterprise organization.

FIG. 2 illustrates one embodiment of an enterprise water usage architecture 200, which includes multiple sensors units 100 from FIG. 1, for collecting and aggregating water usage data. In the architecture 200 of FIG. 2, the sensor units 100 wirelessly interface to a private computer network 210 of a local campus of the enterprise organization. In one embodiment, the private computer network 210 uses a MQTT communication protocol. In another embodiment, the private computer network 210 uses a HTTP communication protocol. The private computer network 210 includes multiple processing nodes (interim nodes) 220 at various zones or levels across the local campus. The private computer network 210 is configured as a local area network (LAN), in accordance with one embodiment. The private computer network 210 is configured as a wide area network (WAN) made up of multiple local area networks (LANs), in accordance with another embodiment.

In one embodiment, the sensor units 100 and the processing nodes 220 are organized in a hierarchical manner. As an example, the sensor units 100 are associated with water-using appliances and are part of an appliance level of the hierarchy. Each sensor unit 100 may have an identifier that can be associated with an identifier of the appliance to which the sensor unit 100 is attached. The identifier of the appliance may be associated with a location of the appliance within the enterprise organization. When a sensor unit 100 transmits time-sampled digital data to a processing node 220 of the private computer network 210, the identifier of the sensor unit 100 and/or the appliance is also transmitted, in accordance with one embodiment.

At a floor-level of the hierarchy, there is one or more processing nodes 220 assigned to each floor of a building on the local campus. A processing node 220 assigned to a floor collects and processes the data wirelessly received from each sensor unit 100 on that floor. For example, there may be ten (10) sensor units 100 on a particular floor of a building. The sensor units 100 may be attached to water inlet pipes associated with water-using appliances (e.g., faucets, sprinklers, and toilets) distributed throughout the floor. A processing node 220 assigned to a floor of a building can have a floor identifier associated with the processing node 220.

In one embodiment, the processing node 220 for a floor collects the time-sampled digital data from each sensor unit 100 on that floor and processes the time-sampled digital data to form spectral data (e.g., via a Discrete Fourier Transform process) and statistical data (data metrics) for each sensor unit 100. The processing node 220 for a floor may also generate flow-rate data from, for example, the spectral data and/or the statistical data. The flow-rate data may be further processed to determine an amount of water used over time. In accordance with one embodiment, the time-sampled digital data, the spectral data, the statistical data, the flow-rate data, and the amount of water used over a period of time each constitute a type of water usage data. Statistical data may also be derived from the spectral data, in accordance with one embodiment. Statistical data may be fed into models or classifiers (possibly adaptive), or may be directly aggregated for reporting purposes, in accordance with various embodiments.

Furthermore, at a building level of the hierarchy, there is one processing node 220 assigned to each building on the local campus. The processing node 220 for a building is configured to collect the water usage data from each processing node for each floor of the building and aggregate the water usage data according to floors and/or groups of floors of the building. Also, there may be one processing node 220 assigned to the local campus. The processing node 220 for the campus is configured to collect the water usage data from each processing node 220 for each building of the campus and aggregate the water usage data according to buildings and/or groups of buildings of the campus. The water usage data for a campus, aggregated at the different hierarchical levels, is known herein as locally aggregated water usage data.

In accordance with one embodiment, data coming from any particular processing node 220 at any particular level of aggregation includes water usage data as well as identifiers which identify the hierarchical path of the water usage data up to that point (e.g., campus identifier, building identifier, floor identifier, sensor/appliance identifier). Other levels of aggregation are possible as well, in accordance with other embodiments. The strict levels of sensor/appliance, floor, building, campus do not have to be followed in all embodiments.

The enterprise water usage architecture 200 also includes a public computer network 230. The public computer network 230 may include the internet, for example, and uses an HTTP (or HTTPS) communication protocol, in accordance with one embodiment. The public computer network 230 provides access to a cloud computing and storage system 240 by private computer networks at various campuses of the enterprise organization. The cloud computing and storage system 240 is configured to receive locally aggregated water usage data from the private computer network 210 as well as from other private computer networks associated with other local campuses of the enterprise organization.

In one embodiment, the cloud computing and storage system 240 acts as an internet-of-things (IoT) back-end for performing data aggregation, storage, and reporting. For example, in one embodiment, the cloud computing and storage system 240 is configured to aggregate the locally aggregated water usage data according to campuses or groups of campuses of the enterprise organization to form globally aggregated water usage data.

The public computer network 230 also provides access to the cloud computing and storage system 230 by user computing devices 250. A user computing device 250 can be a mobile computing device or a desktop computing device, for example, running a computer application, where the computer application provides hierarchical access to the globally aggregated water usage data. For example, a mobile user computing device 250 can execute an enterprise water usage application that allows a user to drill down, via user commands, to various hierarchical levels within the enterprise organization to observe the water usage at a particular level. The user, in addition, can configure individual or aggregated collections of sensor units.

In one embodiment, the enterprise water usage application allows a user to make water usage comparisons between different time frames. For example, if the water usage for a particular building on a particular campus of the enterprise organization is unusually high this month as compared to last month, the user can use the application to drill down and possibly find that the higher water usage can be isolated to a single toilet that is constantly running (using water) instead of shutting off. In an alternative embodiment, the cloud computing and storage system can automatically drill down and perform its own analysis to determine the source of the extra water usage (e.g., the mal-functioning toilet) and report the problem to a user via the computer application running on the user's computing device.

Figure 3:
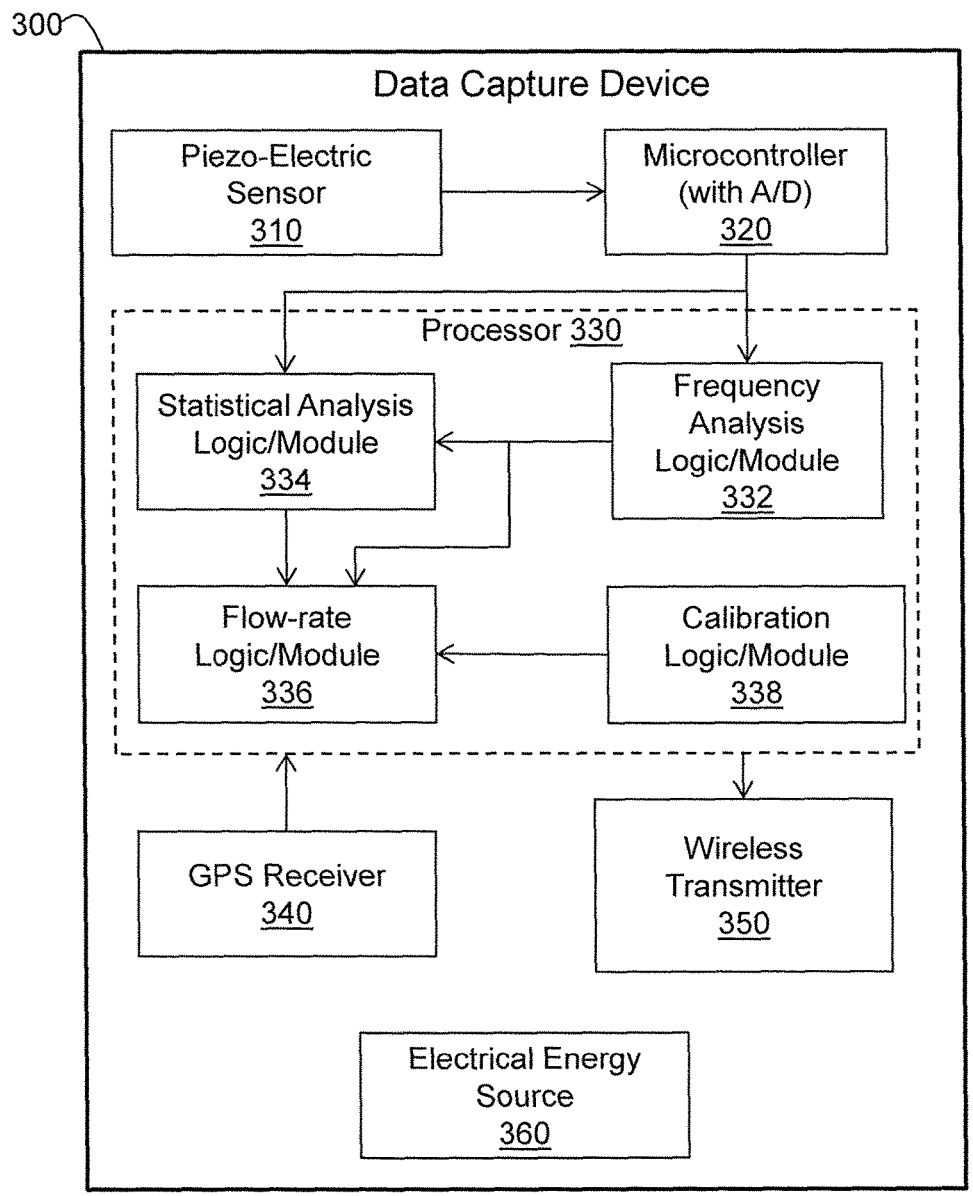
FIG. 3 illustrates one embodiment of a data capture device configured to attach to an external surface of a pipe, sense vibrations in the pipe caused by turbulence due to water flowing through the pipe, and generate water usage data such as statistical and spectral data based on the sensed vibrations.

In one embodiment, each processing node 220 of the private computer network 210 includes a data aggregation logic/module 260 configured to collect, process, aggregate, and distribute water usage data derived from multiple sensor units 100 of the type of FIG. 1 or multiple data capture units 300 of the type of FIG. 3. Some processing nodes 220 collect water usage data directly from sensor units 100 and/or data capture units 300, while other processing nodes 220 collect water usage data from still other processing nodes 220 (e.g., in a hierarchy).

At any particular hierarchical level in the private computer network 210, the data aggregation logic 260 for the processing nodes 220 on that hierarchical level may be tailored or configured to that hierarchical level. For example, the data aggregation logic 260 for a processing node 220 can be tailored by turning on certain functions and turning off other functions. In one embodiment, lowest level processing nodes 220 (i.e., those processing nodes closest to the sensor units) may have Fourier analysis and statistical analysis functions turned on. However, processing nodes 220 that are above the lowest level processing nodes 220 may have the Fourier analysis and statistical analysis functions turned off.

In one embodiment, data aggregation logic 260 of a particular processing node 220 is configured to perform various types of processing on water usage data including Fourier analysis, statistical analysis, flow-rate determination, and flow amount determination over periods of time. For any given processing node 220, the type of processing may be confined to the type of water usage data available to process at the level associated with that processing node 220.

In one embodiment, data aggregation logic 260 of a particular processing node 220 is configured to aggregate the water usage data in a hierarchical manner, from a lowest level (e.g., a sensor or appliance level) to the level at which the particular processing node 220 is deployed. Data aggregation may involve summing certain types of water usage data in a hierarchical manner (e.g., summing estimated amounts of water used at the various levels). Data aggregation may also involve grouping certain types of water usage data in a useful manner (e.g., grouping spectral data with statistical parameter data which can be subsequently processed to form flow rate data for a particular hierarchical level). Other types of data aggregation may be possible as well, in accordance with other embodiments.

In one embodiment, the water usage data is aggregated in such a manner that the integrity of the water usage data at each hierarchical level is maintained. That is, the water usage data is aggregated such that a user can drill down through the hierarchy to observe the water usage data at any particular level, all the way down to a single sensor unit 100 or data capture device 300.

In one embodiment, data aggregation logic 260 of a particular processing node 220 is configured to distribute water usage data to another processing node at a next higher level in the hierarchy, or to the cloud computing and storage system 240. The water usage data that is distributed to the next higher level processing node 220 or to the cloud computing and storage system 240 is an aggregation of the water usage data up to that point through the hierarchy and maintains the integrity of the water usage data at each hierarchical level up to that point.

In this manner, many sensor units 100 can be attached to multiple pipes throughout the zones (e.g., floors of one or more buildings of a campus) of an enterprise organization. Each sensor unit 100 can collect data from a pipe associated with, for example, a water-using appliance and wirelessly transmit the data to a nearest processing node of a local private computer network to be processed. The data can be hierarchically aggregated and provided to a centralized cloud computing and storage system of the enterprise organization. This can be done for multiple campuses of the enterprise organization, allowing a global view of water usage across the enterprise organization to be formed.

FIG. 3 illustrates one embodiment of a data capture device 300 configured to attach to an external surface of a pipe, sense vibrations in the pipe caused by turbulence due to water flowing through the pipe, and generate water usage data such as statistical and spectral data based on the sensed vibrations. The data capture device 300 includes a piezo-electric sensor 310 (equivalent to the piezo-electric sensor 110 of FIG. 1), a microcontroller 320 (equivalent to microcontroller 120 of FIG. 1), processor 330, global positioning system (GPS) receiver 340, wireless transmitter 350 (equivalent to wireless transmitter 130 of FIG. 1), and electrical energy source 360 (equivalent to electrical energy source 140 of FIG. 1).

Furthermore, in other embodiments, the sensor 310 may instead be an accelerometer or a microphone, for example. In one embodiment, the accelerometer produces digital signals in multiple axes. A Euclidean measure can be used to combine the digital signals from the multiple axes (e.g., via the microcontroller 320 or the processor 330). In such an embodiment, a separate analog-to-digital conversion capability in the microcontroller 320 may not be needed.

The data capture device 300 can be thought of as a "smart" sensor unit at least because of the processor 330. In accordance with one embodiment, the processor 330 is configured to execute a spectral frequency analysis module 332, a statistical analysis module 334, a flow-rate module 336, and a calibration module 338. Each of the modules (332, 334, 336, and 338) are implemented as modules of computer-executable instructions stored on a computer-readable medium, in accordance with one embodiment. Other embodiments may provide different logics or combinations of logics that provide the same or similar functionality as the processor and modules of FIG. 3.

Instead of simply sensing mechanical vibrations and generating time-sampled digital data, as does the sensor unit of FIG. 1, the data capture device 300 of FIG. 3 further processes the time-sampled digital data out of the microcontroller 320. The frequency analysis module 332, executing on the processor 330, is configured to perform a frequency analysis on the time-sampled digital data to generate spectral data. In accordance with one embodiment, performing the frequency analysis includes performing a Fourier transform operation on the time-sampled digital data.

The flow-rate module 336, executing on the processor 330, is configured to analyze the spectral data out of the frequency analysis module 332 to determine whether the vibrations sensed by the piezo-electric sensor 310 are caused by a fluid (e.g., water) flowing through a pipe, in accordance with one embodiment. Analyzing the spectral data includes comparing a magnitude value of at least one frequency component of the spectral data to at least one threshold value stored in a memory, in accordance with one embodiment.

The statistical analysis module 334, executing on the processor 330, is configured to perform a statistical analysis on the time-sampled digital data to generate statistical parameter data. The statistical parameter data includes one or more of a mean value, a median value, a standard deviation value, or a variance value of the time-sampled digital data, in accordance with one embodiment. Other types of statistical parameter data may be possible as well, in accordance with other embodiments.

Flow-rate module 336, executing on the processor 330, is configured to estimate a flow rate of the fluid flowing through the pipe based on the statistical parameter data and/or the spectral data. In one embodiment, estimating the flow rate includes comparing the statistical parameter data and/or the spectral data to calibration data generated for the pipe and stored in a memory. The calibration data characterizes multiple flow rates of the fluid through the pipe in terms of statistical parameter data and/or spectral data generated as part of a calibration process.

In one embodiment, the calibration data is generated by the calibration module 338 executing on the processor 330. The calibration data can be manually generated by the calibration module 338, during a calibration mode, at different water settings of the pipe that span settings between maximum flow (max on) and no flow (off), in accordance with one embodiment. Alternatively, the calibration data can be automatically generated as the result of a machine-learning process, in accordance with another embodiment. In the machine-learning process, a model relates data derived from the piezo-electric sensor 310 to actual flow through the pipe. The actual flow through the pipe is measured by an in-line flow meter or other flow-sensing device, in accordance with one embodiment.

In accordance with an alternative embodiment, instead of the modules 332, 334, 336, and 338 being implemented as computer instructions executing on the processor 330, the modules may each be implemented as hardware logics. For example, the modules may each be implemented on an application specific integrated circuit (ASIC). Such a hardware implementation may provide results in less time than an equivalent software solution running on a processor.

In one embodiment, global positioning system (GPS) receiver 340 is configured to generate location data that represents the geographic location of the pipe. The location data can be associated with the resultant water usage data which can both be transmitted by the wireless transmitter 350 to a processing node 220 of a local private computer network 210 of an enterprise organization. However, the processing node does 220 not have to be configured to perform frequency analysis, statistical analysis, or flow-rate analysis for the data capture device 300 since the data capture device 300 has already performed these analyses.

In this manner, a "smart" sensor unit can be provided that relieves a processing node of a local private computer network from having to perform a frequency analysis, a statistical analysis, and a flow-rate analysis for each sensor unit attached to each pipe, for example, on a floor of a building. Instead, the analyses are performed for each pipe by its attached "smart" sensor unit (i.e., data capture device). Initially, the data capture device 300 of FIG. 3 may be larger and more expensive than the sensor unit of FIG. 1. However, as time goes on, the difference in size and cost between the data capture device 300 and the sensor unit 100 may become negligible.

Figure 4:
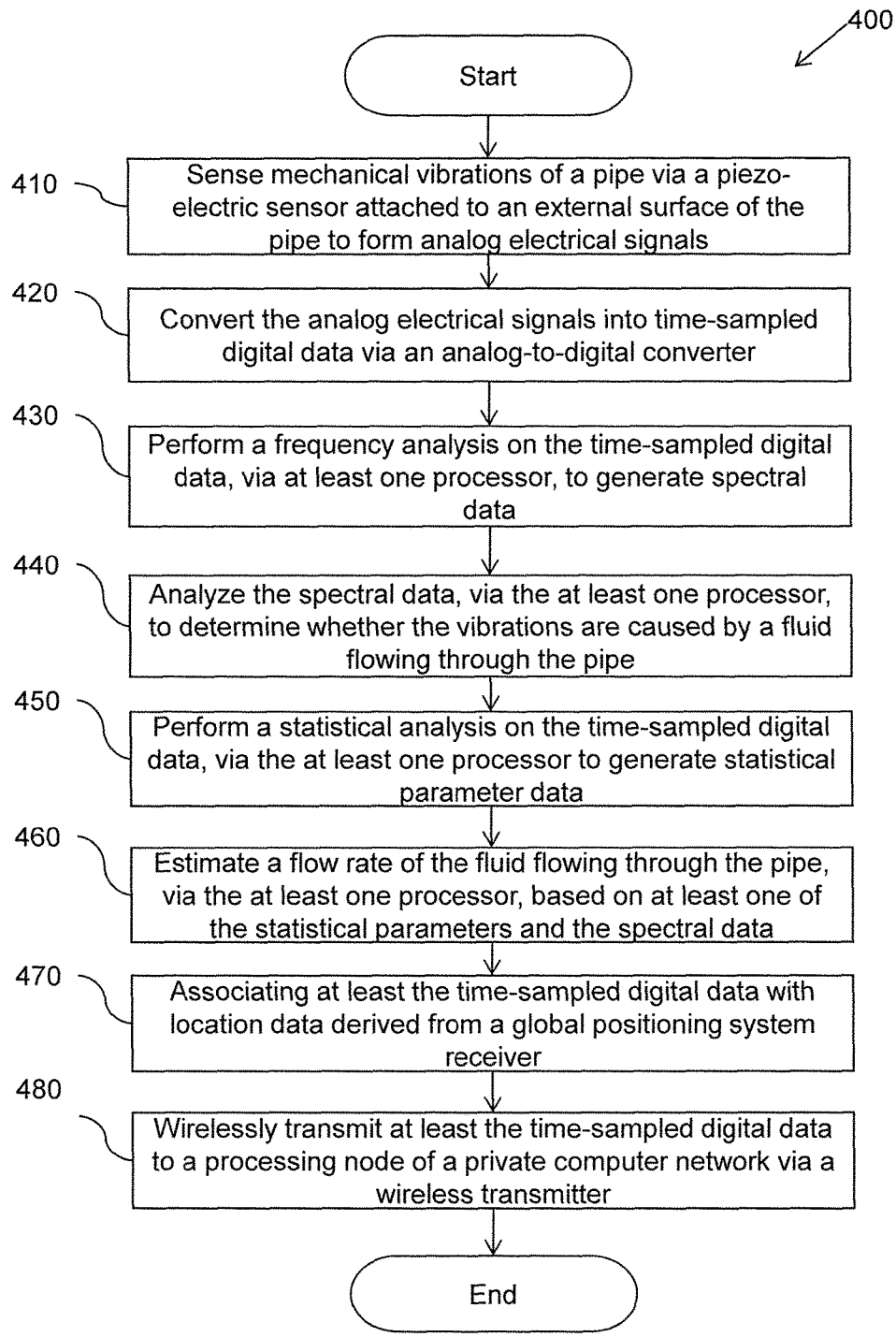
FIG. 4 illustrates one embodiment of a method for generating water usage data based on sensing vibrations in a pipe using the sensor unit of FIG. 1 or the data capture device of FIG. 3.

FIG. 4 illustrates one embodiment of a method 400 for generating water usage data based on sensing vibrations in a pipe using the sensor unit 100 of FIG. 1 or the data capture device 300 of FIG. 3. Method 400 describes operations of the data capture device 300 and/or a combination of the sensor unit 100 of FIG. 1 and a processing node 220 of FIG. 2. For example, in one embodiment, method 400 is implemented, at least in part, by a processor configured to execute a computer application. The computer application is configured to process data in electronic form and includes stored executable instructions that perform at least some of the functions of method 400 when executed by the processor.

Method 400 will be described from the perspective of a single pipe on a floor of a building of a campus of a multi-campus enterprise organization. The single pipe is associated with a water-using appliance and supplies water to the water-using appliance, as called for, under normal operation. However, a problem such as, for example, a leak in the pipe or a stuck valve could cause water to flow through the pipe in an undesirable manner.

Upon initiating method 400, at block 410, mechanical vibrations of a pipe are sensed via a piezo-electric sensor attached to an external surface of the pipe to form analog electrical signals. In one embodiment, the piezo-electric sensor is the piezo-electric sensor 110 of FIG. 1 or the piezo-electric sensor 310 of FIG. 3. At block 420, the analog electrical signals are converted into time-sampled digital data via an analog-to-digital converter. In one embodiment, the analog-to-digital converter is part of the microcontroller 120 of FIG. 1 or the microcontroller 320 of FIG. 3.

At block 430, a frequency analysis is performed on the time-sampled digital data, via at least one processor, to generate spectral data. The spectral data includes components of magnitude data at certain frequencies. The components of the spectral data may be grouped into different frequency bands. For example, when water is flowing through the pipe in a normal manner, components of the spectral data may be present within frequency bands spanning 50-100 Hz and 150-200 Hz. Performing a frequency analysis includes performing a Fourier transform operation, in accordance with one embodiment. The frequency analysis may be performed by the processor 330 of FIG. 3 executing the frequency analysis module 332 in one embodiment. In another embodiment, the frequency analysis may be performed by a processor of a processing node 220 in FIG. 2 executing an equivalent frequency analysis module that is part of the data aggregation logic 260. In accordance with an alternative embodiment, the frequency analysis may be performed via hardware logic, for example, in the form of an application specific integrated circuit (ASIC).

At block 440, the spectral data is analyzed, via at least one processor, to determine whether the sensed vibrations are caused by a fluid (e.g., water) flowing through the pipe. For example, a magnitude value of at least one component of the spectral data may be compared to a threshold value stored in a memory to determine whether a fluid is flowing through the pipe. As an example, a frequency component existing at 75 Hz and having a magnitude value greater than ten (10) units may be a very strong indicator of water flowing through the pipe. The determination of flow may be made by the processor 330 of FIG. 3 executing the flow-rate module 336 in one embodiment. In another embodiment, the determination of flow may be made by a processor of a processing node 220 of FIG. 2 executing an equivalent flow-rate module that is part of the data aggregation logic 260. In accordance with an alternative embodiment, the determination of flow may be performed via hardware logic, for example, in the form of an application specific integrated circuit (ASIC). In another alternative embodiment, the determination of flow may be performed by software logic such as, for example, a binary classifier.

At block 450, a statistical analysis is performed on the time-sampled digital data, via at least one processor, to generate statistical parameter data. The statistical parameter data may include data characterizing a mean value, a median value, a standard deviation value, or a variance value derived from the time-sampled digital data. The statistical analysis may be performed by the processor 330 of FIG. 3 executing the statistical analysis module 334 in one embodiment. In another embodiment, the statistical analysis may be performed by a processor of a processing node 220 of FIG. 2 executing an equivalent statistical analysis module that is part of the data aggregation logic 260. In accordance with an alternative embodiment, the statistical analysis may be performed via hardware logic, for example, in the form of an application specific integrated circuit (ASIC).

At block 460, a flow rate of fluid flowing through the pipe is estimated (not just whether there is flow or not), via at least one processor, based on the statistical parameter data and/or the spectral data. For example, in one embodiment, estimating the flow rate through the pipe involves comparing the statistical parameter data and/or the spectral data to calibration data generated for the pipe and stored in a memory. The calibration data characterizes multiple possible flow rates of a fluid (e.g., water) through the pipe. The flow rate may be generated by the processor 330 of FIG. 3 executing the flow-rate module 336 in one embodiment. In another embodiment, the flow rate may be generated by a processor of a processing node 220 of FIG. 2 executing an equivalent flow-rate module that is part of the data aggregation logic 260. In accordance with an alternative embodiment, the flow rate may be generated via hardware logic, for example, in the form of an application specific integrated circuit (ASIC), or by software logic in the form of a regression tree.

At block 470, the time-sampled digital data (and possibly other water usage data such as the spectral data, the statistical parameter data, and the flow-rate data) is associated with location data derived from a global positioning system (GPS) receiver that specifies the location of the pipe. In one embodiment, the GPS receiver may be the GPS receiver 340 of FIG. 3. In another embodiment, the GPS receiver may be a standalone device located in the vicinity of the pipe. The processor 330 of FIG. 3 performs the association, in accordance with one embodiment as the time-sampled digital data is received by the processor 330 (or as the spectral data, the statistical parameter data, and the flow-rate data is generated by the processor 330). In accordance with an alternative embodiment, the association may be made by a processing node 220 of FIG. 2 upon receiving the time-sampled digital data from sensor unit 100 and the location data from a standalone GPS receiver in the vicinity of the pipe.

At block 480, the time-sampled digital data (and possibly other water usage data such as the spectral data, the statistical parameter data, and the flow-rate data) is wirelessly transmitted (along with any associated location data) to a processing node 220 of a private computer network 210 via a wireless transmitter. The wireless transmitter may be the wireless transmitter 130 of FIG. 1 in one embodiment, or the wireless transmitter 350 of FIG. 3 in another embodiment. As described previously herein, the processing node 220 is configured to wirelessly receive data from multiple sensor units 100 and/or data capture devices 300 via, for example, a MQTT communication protocol.

In this manner, time-sampled digital data from a single sensor can be generated and analyzed to form water usage data. This process can be repeated for each of multiple sensors across multiple appliances and zones of a campus of an enterprise organization. Inexpensive piezo-electric sensor units or data capture devices can be used to monitor pipes providing water to appliances. In one embodiment, redundant sensor units or data capture devices can be applied to the same pipe, providing validity checking and/or reduction of variance in the sampled data.

Figure 5:
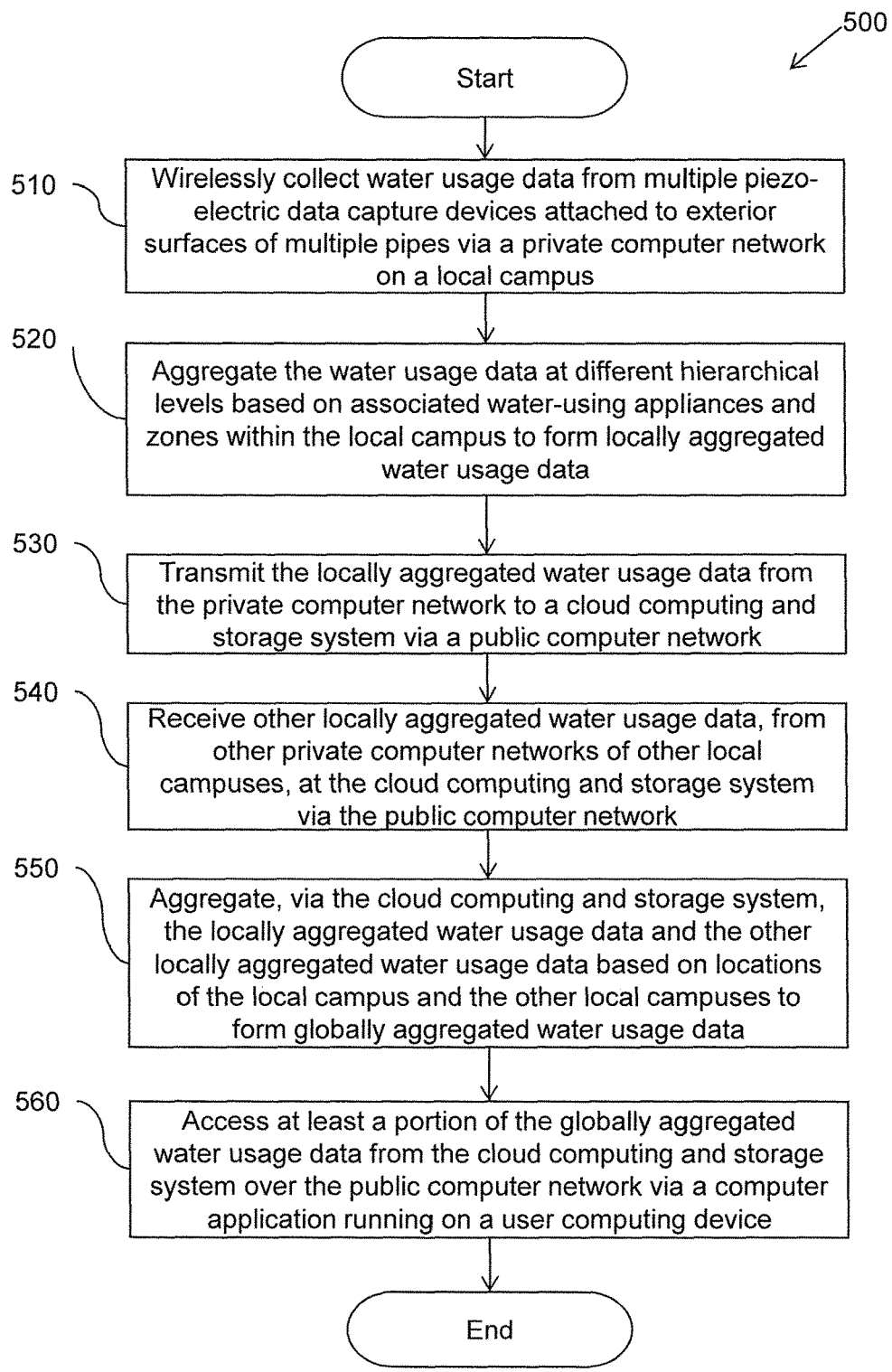
FIG. 5 illustrates one embodiment of a method for collecting and aggregating water usage data across an enterprise organization using, for example, the enterprise water usage architecture of FIG. 2.

FIG. 5 illustrates one embodiment of a method 500 for collecting and aggregating water usage data across an enterprise organization using, for example, the enterprise water usage architecture 200 of FIG. 2. Method 500 is performed, at least in part, by a networked computing system and describes operations of the enterprise water usage architecture 200 of FIG. 2. For example, in one embodiment, method 500 is implemented, at least in part, by processors of the architecture 200 configured to execute one or more computer applications. The computer applications are configured to process data in electronic form and include stored executable instructions that perform the functions of method 500 when executed by the processors.

Method 500 will be described from the perspective of multiple pipes distributed across multiple floors of multiple buildings across multiple campuses of an enterprise organization. The multiple pipes are associated with multiple water-using appliances and supply water to the water-using appliances, as called for, under normal operation. Method 500 provides a global view of the water usage situation for the enterprise organization and will be described with respect to the enterprise water usage architecture 200 of FIG. 2.

Upon initiating method 500, at block 510, water usage data is wirelessly collected from multiple sensor units 100 and/or data capture devices 300 attached to exterior surfaces of multiple pipes via a private computer network 210 on a local campus of an enterprise organization. Each of the multiple sensor units or data capture devices include a piezo-electric sensor configured to sense and convert mechanical vibrations to electrical signals. The water usage data is derived from the electrical signals. Wireless collection occurs via an MQTT communication protocol (MQ Telemetry Transport), in accordance with one embodiment. Again, water usage data may include any or all of time-sampled digital data, spectral data, statistical data, flow-rate data, or water amounts used over a period of time (e.g., in gallons or liters). Other types of water usage data are possible as well, in accordance with various embodiments.

At block 520, the water usage data is aggregated, via the private computer network 210, at different hierarchical levels based on associated water-using appliances and zones within the local campus to form locally aggregated water usage data. For example, the different hierarchical levels may correspond to a water-using appliance level, a floor level, a building level, and a campus level. Aggregation of the water usage data is performed by the various processing nodes (interim nodes) 220 assigned to the different levels of the private computer network 210.

At block 530, the locally aggregated water usage data is transmitted from the private computer network 210 to a cloud computing and storage system 240 via a public computer network 230. For example, a top-level (campus level) processing node 220 of the private computer network 210 may connect to the internet and transmit the locally aggregated water usage data to the cloud computing and storage system 240 via the HTTP protocol. At this point, the cloud computing and storage system 240 has all of the locally aggregated water usage data from the private computer network 210 for the entire local campus. The locally aggregated water usage data is structured to maintain the hierarchy of the water usage data at the various levels all the way down to an individual pipe or appliance.

At block 540, other locally aggregated water usage data, from other private computer networks of other local campuses of the enterprise organization, is received and collected at the cloud computing and storage system 240 via the public computer network 230. The other locally aggregated water usage data is collected by a similarly configured network as the network 210 including a set of water sensor units attached at water-using appliances. The other locally aggregated water usage data is transmitted by the other private computer networks to the cloud computing and storage system 240 in a manner similar to that of block 530.

At block 550, the locally aggregated water usage data from all of the local campuses is aggregated, via the cloud computing and storage system 240 based on the locations of the local campuses to form globally aggregated water usage data. The globally aggregated water usage data includes the locally aggregated water usage data from all of the local campuses of the enterprise organization and is structured to maintain the hierarchy of the water usage data at the various levels all the way down to an individual pipe or appliance.

At block 560, at least a portion of the globally aggregated water usage data is accessed from the cloud computing and storage system 240 over the public computer network 230 via a computer application running on a user computing device 250. For example, a maintenance worker in the field may use his mobile phone to access a portion of the globally aggregated water usage data from the cloud computing and storage system 240 via the internet. The computer application on his mobile phone may display a map associated with the portion of the water usage data accessed. The maintenance worker may proceed to drill down through the water usage data to find water usage data associated with the building where he is currently working to solve a water problem (e.g., a leak).

In this manner, water usage data can be collected and aggregated across the enterprise organization and be made available to employees of the enterprise organization (and/or approved contractors) at all levels. Such access to enterprise-wide water usage data allows water usage reports to be readily generated by management, and allows trouble-shooters or maintenance workers to quickly diagnose problems associated with the water system throughout the enterprise organization at multiple levels, all the way down to an individual pipe or appliance.

Figure 6:
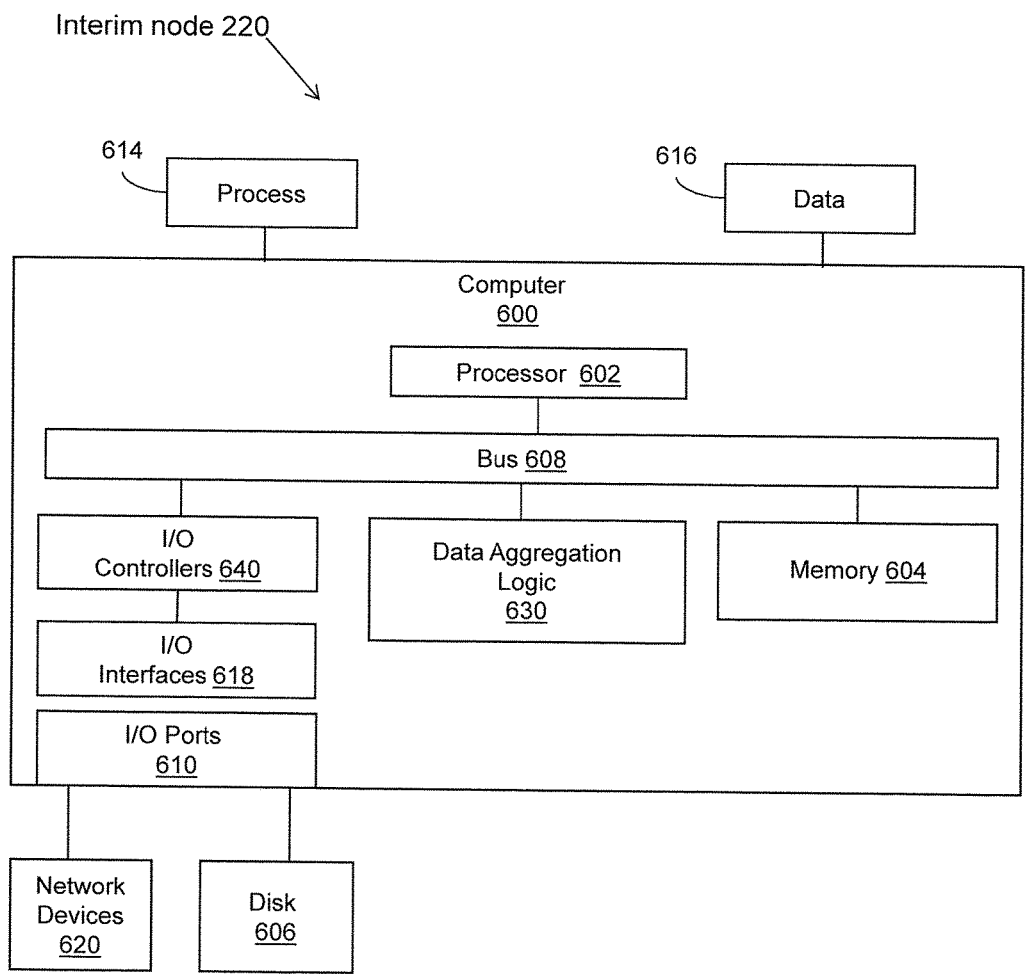
FIG. 6 illustrates one embodiment of an interim node (processing node) of the enterprise water usage architecture of FIG. 2, configured to collect, process, aggregate, and distribute water usage data derived from multiple sensor units of the type of FIG. 1 or multiple data capture units of the type of FIG. 3.

FIG. 6 illustrates one embodiment of an interim node (processing node) 220, of the private computer network 210 of the enterprise water usage architecture 200 of FIG. 2, configured to collect, process, aggregate, and distribute water usage data derived from multiple sensor units of the type of FIG. 1 or multiple data capture units of the type of FIG. 3. FIG. 6 illustrates one example embodiment of a networked interim node 220 upon which an embodiment of data aggregation logic may be implemented. The example interim node 220 may have a computer 600 that includes a processor 602, a memory 604, and input/output ports 610 operably connected by a bus 608 (an operable connection).

In one example, the computer 600 may include data aggregation logic 630 (corresponding to data aggregation logic 260 from FIG. 2) configured with a programmed algorithm as disclosed herein to collect, process, aggregate, and distribute water usage data for a zone or level of an enterprise organization. In different examples, logic 630 may be implemented in hardware, a non-transitory computer-readable medium with stored instructions, firmware, and/or combinations thereof. While logic 630 is illustrated as a hardware component attached to the bus 608, it is to be appreciated that in other embodiments, logic 630 could be implemented in the processor 602, a module stored in memory 604, or a module stored in disk 606.

In one embodiment, logic 630 or the computer 600 is a means (e.g., structure: hardware, non-transitory computer-readable medium, firmware) for performing the actions described. In some embodiments, the computer 600 may be a server operating in a cloud computing system, a server configured in a Software as a Service (SaaS) architecture, a smart phone, laptop, tablet computing device, and so on.

The means may be implemented, for example, as an ASIC programmed to facilitate the collection, processing, aggregation, and distribution of water usage data. The means may also be implemented as stored computer executable instructions that are presented to the computer 600 as data 616 that are temporarily stored in memory 604 and then executed by processor 602.

Logic 630 may also provide means (e.g., hardware, non-transitory computer-readable medium that stores executable instructions, firmware) for facilitating the collection, processing, aggregation, and distribution of water usage data.

Generally describing an example configuration of the interim node 200 having the computer 600, the processor 602 may be a variety of various processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A storage disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 is configured to operate in a network environment and thus may be connected to the network devices 620 via the i/o interfaces 618, and/or the i/o ports 610. Through the network devices 620, the computer 600 may interact with a private computer network. Through the network, the computer 600 may be logically connected to remote computers. Networks with which the computer 600 may interact include, but are not limited to, a LAN, a WAN, the internet, and other networks.

Systems, methods, and other embodiments have been described that are configured to generate, process, collect, aggregate, and distribute water usage data. In one embodiment, water usage data is collected from multiple data capture devices attached to exterior surfaces of multiple pipes via a private computer network on a local campus of an enterprise organization. Each of the multiple data capture devices include a piezo-electric sensor configured to sense and convert mechanical vibrations to electrical signals. The water usage data is derived from the electrical signals. The water usage data is aggregated, via the private computer network, at different hierarchical levels based on associated water-using appliances and zones within the local campus to form locally aggregated water usage data. The locally aggregated water usage data is transmitted from the private computer network to a cloud computing and storage system via a public computer network.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A computing system, comprising:
   one or more processing nodes;
   a plurality of data capture devices attached to an external surface of a plurality of pipes that are distributed in multiple floors of multiple buildings of an organization, each data capture device comprising:
   (i) a piezo-electric sensor attached to the external surface of a respective pipe from the plurality of pipes, and each piezo-electric sensor being configured to sense mechanical vibrations of the respective pipe to which the piezo-electric sensor is attached to form analog electrical signals;
   (ii) a microcontroller configured to convert the analog electrical signals into time-sampled digital data;
   (iii) a global positioning system (GPS) device configured to generate location data that represents a geographic location of the respective pipe to which the data capture device is attached; and
   (iv) a wireless transmitter configured to transmit, to the one or more processing nodes, the time-sampled digital data from the respective pipe and the geographic location of the respective pipe;
   each processing node of the one or more processing nodes comprising:
   a memory configured to store at least data and instructions;
   a processor configured to execute the instructions;

wherein the instructions include instructions that when executed by the processor cause the processor to:
(i) generate water usage data from the time-sampled digital data received from the plurality of data capture devices, and associate each water usage data to a corresponding pipe from the plurality of pipes to create different hierarchical levels based at least on the plurality of floors;
(ii) aggregate the water usage data based at least on the different hierarchical levels;
(iii) perform a frequency analysis on the time-sampled digital data to generate spectral data for each of the plurality of floors; and
(iv) analyze the spectral data to determine whether the vibrations are caused by a fluid flowing through the corresponding pipe and determine an amount of the fluid used over a time period by each of the plurality of floors.

2. The computing system of claim 1, wherein the fluid includes water.

3. The computing system of claim 1, wherein the instructions to perform the frequency analysis are configured to cause the processor to perform the frequency analysis at least in part by performing a discrete Fourier transform operation.

4. The computing system of claim 1, further comprising instructions that when executed cause the processor to analyze the spectral data at least in part by comparing a magnitude value of at least one frequency component of the spectral data to at least one threshold value stored in the memory.

5. The computing system of claim 1, further comprising instructions that when executed cause the processor to perform a statistical analysis on the time-sampled digital data to generate statistical parameter data.

6. The computing system of claim 5, further comprising instructions that when executed cause the processor to estimate a flow rate of the fluid flowing through each of the plurality of pipes based on at least one of the statistical parameter data and the spectral data.

7. The computing system of claim 5, wherein the statistical parameter data include at least one of a mean value, a median value, a standard deviation value, or a variance value of the time-sampled digital data.

8. The computing system of claim 5, further comprising instructions that when executed cause the processor to generate calibration data for each of the plurality of pipes that characterizes a plurality of possible flow rates of the fluid flowing through the plurality of pipes.

9. The computing system of claim 8, further comprising instructions that when executed cause the processor to estimate a flow rate of the fluid flowing through the plurality of pipes at least in part by comparing at least one of the statistical parameter data and the spectral data to the calibration data.

10. A method, comprising:
sensing mechanical vibrations of a plurality of pipes by at least one piezo-electric sensor attached to an external surface of each of the plurality of pipes that are distributed in multiple floors of multiple buildings of an organization, wherein the each of the piezo-electric sensors forms analog electrical signals from the mechanical vibrations of a respective pipe to which the piezo-electric sensor is attached;
converting, by at least a microcontroller, the analog electrical signals into time-sampled digital data for each of the plurality of pipes;
generating location data that represents a geographic location of each of the plurality of pipes and associating the time-sampled digital data;
wirelessly transmitting, to one or more processing nodes, the time-sampled digital data from each of the plurality of pipes and the geographic location of a corresponding pipe;
storing, by the one or more processing nodes, at least the time-sampled digital data and the geographic location for each of the plurality of pipes into at least a memory;
generating water usage data from the time-sampled digital data received from the plurality of pipes, and associating each water usage data to a corresponding pipe from the plurality of pipes to create different hierarchical levels based at least on the plurality of floors;
aggregating the water usage data based at least on the different hierarchical levels:
performing, by at least a processor, a frequency analysis on the time-sampled digital data from the water usage data to generate spectral data for each of the plurality of floors; and
analyzing, by at least the processor, the spectral data to determine whether the vibrations are caused by a fluid flowing through each of the plurality of pipes and determining an amount of the fluid used over a time period by each of the plurality of floors.

11. The method of claim 10, wherein the sensing senses fluid in the pipe that includes water.

12. The method of claim 10, wherein performing the frequency analysis includes, at least in part, performing a discrete Fourier transform operation.

13. The method of claim 10, wherein analyzing the spectral data is performed at least in part by comparing a magnitude value of at least one frequency component of the spectral data to at least one threshold value stored in the memory.

14. The method of claim 10, further comprising performing a statistical analysis on the time-sampled digital data to generate statistical parameter data.

15. The method of claim 14, further comprising estimating a flow rate of the fluid flowing through the pipe based on at least one of the statistical parameter data and the spectral data.

16. The method of claim 10, further comprising generating calibration data for the pipe that characterizes a plurality of possible flow rates of the fluid flowing through the pipe.

* * * * *

UNITED STATES PATENT AND TRADEMARK OFFICE
CERTIFICATE OF CORRECTION

PATENT NO. : 10,306,340 B2
APPLICATION NO. : 15/421478
DATED : May 28, 2019
INVENTOR(S) : Goldberg et al.

Page 1 of 1

It is certified that error appears in the above-identified patent and that said Letters Patent is hereby corrected as shown below:

In the Claims

In Column 18, Line 27, in Claim 10, delete "levels:" and insert -- levels; --, therefor.

Signed and Sealed this
Twenty-first Day of July, 2020

Andrei Iancu
*Director of the United States Patent and Trademark Office*